United States Patent [19]

Claussen et al.

[11] 4,419,311

[45] Dec. 6, 1983

[54] PRODUCTION OF HIGH-STRENGTH CERAMIC BODIES OF ALUMINA AND UNSTABILIZED ZIRCONIA WITH CONTROLLED MICROFISSURES

[76] Inventors: Nils Claussen, Brandenburger Str. 13, Warnbronn, Fed. Rep. of Germany, 7251; Jörg Steeb, Reessweg 21, Stuttgart, Fed. Rep. of Germany, 7000

[21] Appl. No.: 280,408

[22] Filed: Jul. 6, 1981

Related U.S. Application Data

[60] Division of Ser. No. 167,898, Jul. 14, 1980, Pat. No. 4,298,385, which is a continuation of Ser. No. 4,120, Jan. 17, 1979, abandoned, which is a continuation-in-part of Ser. No. 738,409, Nov. 3, 1976, abandoned.

[30] Foreign Application Priority Data

Nov. 5, 1975 [DE]  Fed. Rep. of Germany ....... 2549652

[51] Int. Cl.³ .................... C04B 35/00; C04B 35/10; C04B 35/48; C04B 35/71
[52] U.S. Cl. ..................................... 264/60; 264/332; 501/94; 501/105; 501/153

[58] Field of Search ............... 501/105, 94; 264/60, 264/332

[56] References Cited

U.S. PATENT DOCUMENTS

| | | | |
|---|---|---|---|
| 3,247,000 | 4/1966 | Taylor | 501/105 |
| 4,067,745 | 1/1978 | Garvie et al. | 501/104 |
| 4,073,845 | 2/1978 | Buljan et al. | 501/97 |
| 4,205,964 | 6/1980 | Hill | 501/105 X |
| 4,322,249 | 3/1982 | Claussen et al. | 264/332 X |

*Primary Examiner*—Helen M. McCarthy

[57] ABSTRACT

A method of preparing a ceramic body of high toughness from an aluminum oxide matrix forming ceramic material by using a ceramic embedment material to generate tensile stresses for the formation of controlled microfissures, is provided. The ceramic embedment material comprises 4 to 25% of the volume of the body to be formed, of unstabilized zirconium dioxide and/or hafnium dioxide with a particle size of 0.3 to 1.25 um. This is mixed with the aluminum oxide material and the mixture is sintered by hot-pressing in a mold at a temperature of 1400° C. to 1500° C.

3 Claims, 6 Drawing Figures

PRODUCTION OF HIGH-STRENGTH CERAMIC BODIES OF ALUMINA AND UNSTABILIZED ZIRCONIA WITH CONTROLLED MICROFISSURES

This is a division, of application Ser. No. 167,898, filed July 14, 1980, now U.S. Pat. No. 4,298,385; which in turn is a continuation of Ser. No. 4,120, filed Jan. 17, 1979, now abandoned, itself a continuation-in-part of Ser. No. 738,409 filed Nov. 3, 1976, now abandoned.

The invention concerns a ceramic body of great toughness consisting of a ceramic matrix and at least one phase of ceramic embedment dispersed therein, a method of preparing said body and the utilization thereof.

The resistance of a ceramic to temperature change is generally improved if its toughness is improved. Within certain limits the resistance to temperature change can also be improved by improving the strength of the ceramic, yet the temperature change resistance thus achieved does not suffice for a great number of applications, because in the event of abrupt temperature changes, the local thermal expansions achieve values which are of the order of magnitude of the theoretical strength ($\sim N \, 10^5 \, MN/m^2$). Such tensions can be compensated only by energy absorbing processes. A measure of the ability of a material to dissipate peak tensions before a catastrophic fracture begins, i.e., to absorb elastic energy, is its toughness $K_{Ic}$.

It is known that the toughness of a ceramic can be increased by the embedding therein of a second phase; for example, the fracture energy of a glass is increased by the embedment of aluminum oxide balls (F. F. Lange, J. Amer. Ceram. Soc. 56 [9], 445-50 [1973]), this effect being attributed to the interaction between the fracture front and the second phase (F. F. Lange, Phil. Mag. 22 [179], 983-92 [1970]). The energy annihilation is accomplished in this case by mechanisms such as fracture branching, blunting of the fissures, lengthening of the fracture front, and plastic deformation of the embedded phase.

Also known is the good temperature change resistance of "rattle bricks," the term used to describe bricks containing partially coherent cracks, which give off a rattling noise when shaken. Such bricks, however, have extremely poor strength and therefore they are unsuitable for many applications.

Lastly, it is known (D. J. Green et al., J. Amer. Ceram. Soc. 57, 135 [1974]) that partially stabilized zirconium dioxide has a high temperature change resistance. The term "partially stabilized zirconium dioxide" refers to a zirconium dioxide which has been stabilized with CaO, $Y_2O_3$ or MgO to the extent of only 40 to 60% by volume.

The invention is addressed to the problem of creating a ceramic body of the kind described initially, which will have a substantially greater toughness than known ceramics and hence an improved resistance to temperature change and improved impact strength, but which at the same time will have a substantially equally great mechanical strength. The invention is furthermore addressed to the task of creating a method for the production of such ceramic bodies.

This problem is solved in accordance with the invention in that, in a ceramic body of the kind initially described, the ceramic embedment is present, at the firing temperature of the ceramic body and at room temperature, in different anantiotropic solid modifications whose densities are decidedly different, and that the ceramic body is shot through with extremely fine and discrete microfissures in a high density, or microfissure nucleation sites where microfissures are created when an external load is applied to the ceramic body.

This brings it about that energy put into the ceramic body from without is absorbed by nucleation and subcritical growth of the microfissures without the occurrence of damage. The ceramic bodies of the invention therefore have, in comparison with known ceramics of the same kind, a substantially increased toughness, temperature change resistance and impact strength, and at the same time a high mechanical strength.

Further developments of the invention consist in the fact that the ceramic embedment has a lower coefficient of expansion than the ceramic matrix, in the fact that the ceramic embedment consists of unstabilized zirconium dioxide particles, in the fact that the ceramic matrix consists of $Al_2O_3$, in the fact that the $ZrO_2$ content amounts to from 4 to 25%, preferably from 8 to 25%, by volume, and in the fact that the $ZrO_2$ particles are dispersed in the matrix in the form of agglomerates of an average agglomerate size of 2 to 15 $\mu m$, the agglomerates consisting of submicron particles.

Due to the fact that the ceramic embedment has a lower coefficient of expansion than the ceramic matrix, the stresses produced in the body upon cooling due to the phase transformation of the embedment entailing a volume change, resulting in the formation of extremely fine microfissures and microfissure nucleation sites, are further increased by additional stresses which develop due to the difference between the expansion coefficients of the embedment and the ceramic matrix. Particularly advantageous is the use of unstabilized $ZrO_2$ particles as the ceramic embedment, since in $ZrO_2$ the difference in density between the tetragonal modification, which is resistant above the transformation temperature of about 1100° C., and the monoclinic modification, which is resistant below about 1100° C., is particularly great, that is, the phase transformation entails an especially great volume change. Particularly advantageous, furthermore, is the combination of unstabilized zirconium dioxide as embedment and aluminum oxide as the ceramic matrix, since the matrix will then combine in itself the advantages of the use of unstabilized zirconium dioxide particles and those of the use of materials of different coefficients of expansion, leading to the production of extremely fine microfissures and a high fissure density in the body, and thus very significantly increases the toughness, temperature change resistance and impact strength of the body. Furthermore, ceramic bodies having a zirconium dioxide content of 4 to 25% by volume, and those which contain the zirconium dioxide phase in the form of particles or agglomerates of an average size of 2 to 15 $\mu m$, the agglomerates consisting of submicron particles, have proven to be especially suited to a great number of applications.

In an especially preferred embodiment, the ceramic body of the invention contains additionally an embedded phase which in turn consists of a ceramic matrix and at least one phase of a ceramic embedment dispersed therein, but a ceramic embedment content that is different from the content of the ground material.

This brings it about that, upon the cooling of the body, a uniformly oriented stress is superimposed on the above-described stress resulting in the formation of extremely fine microfissures, intensified by the phase transformation of the embedment material which entails a volume change. If this superimposed stress is a tensile stress, the microfissures will run preferably vertically thereto, but if the superimposed stress is a compressive stress, the microfissures will run preferably parallel thereto. In this preferred embodiment of the ceramic body, the fissures are therefore oriented, whereas in the above-described embodiments of the invention they extend tangentially from the particles of the embedment in random fashion. The oriented microfissures in turn bring about a still further increased toughness, temperature change resistance and impact strength in the ceramic body.

According to additional preferred embodiments of the invention, the additionally embedded phase consists of the same ceramic matrix and the same embedment as the ground material, the difference in the unstabilized $ZrO_2$ particle content in the additionally embedded phase on the one hand and in the ground material on the other hand is at least 3% by volume, the content of the $ZrO_2$ particles in the additionally embedded phase is at least 3% by volume greater than it is in the ground material, the additionally embedded phase containing preferably from 12 to 20% by volume and the ground material containing preferably 9 to 17% zirconium dioxide by volume.

According to another embodiment, the ceramic body of the invention consists of at least 2 layers having different contents of ceramic embedment material.

The solution of the problem furthermore consists, in accordance with the invention in using as the ceramic embedment material, in a process of the kind described in the beginning, a material which is present in different enantiotropic solid modifications at the firing temperature and at room temperature, and in some cases is dried together with the ceramic material forming the matrix after they have been mixed together and then pressed into shape and sintered at a temperature that is above the phase transformation temperature of the ceramic embedment, or is pressed at such a temperature in a mold.

This brings it about that the ceramic embedment material is dispersed especially uniformly in the ceramic material forming the matrix, and that the dry mixture is shaped and fired in a simple procedure, and is heated above the phase transformation temperature of the ceramic embedment.

Further developments of the process of the invention consist in using as the ceramic embedment a material which has a smaller coefficient of expansion than the ceramic material forming the matrix, in using unstabilized $ZrO_2$ as the embedment material and $Al_2O_3$ as the ceramic material forming the matrix, in using the unstabilized $ZrO_2$ in the form of particles of an average size of 0.1 to 6 $\mu$m, in performing the mixing in a ball mill with an inert mixing and grinding container and inert balls, using an inert mixing liquid, and by using a graphite mold as the hot pressing mold.

The ceramic bodies containing an additionally embedded phase with a ceramic embedment content that is different from the ground material content can be prepared in accordance with the invention by first producing spherical agglomerates having a certain content of ceramic embedment material as described above, and then coating it with similar material, here referred to as "ground material", which differs from the material of the spherical agglomerates only in a different content of ceramic embedment material, then pressing it in a mold, and sintering it at a temperature which is higher than the phase transformation temperature of the ceramic embedment material, or pressing it at such a temperature.

Particularly advantageous, lastly, is the use of a ceramic body of the invention as a "ductile" high-temperature gas turbine element.

The core of the invention consists, as already indicated, in producing controlled microfissures or microfissure nucleation sites in a ceramic matrix by means of local peak stresses during its production.

The tensile stresses $\sigma_t$ about a spherical particle of the radius R are given, according to J. Selsing, J. Amer. Ceram. Soc. 44 (80 419 (1961), by the Equation 1:

$$\sigma_t = \frac{(\alpha_m - \alpha_p)(T_1 - T_o)(R/r)^3 + \epsilon}{2[(1 + \nu_m)/2E_m + (1 - 2\nu_p)/E_p]} \quad (1)$$

wherein:
$\alpha_{m,p}(\alpha_m > \alpha_p)$ = coefficient of expansion of the matrix and of the embedded phase,
$\nu_{m,p}$ = Poisson number of the matrix and of the embedded phase, respectively,
$E_{m,p}$ = Modulus of elasticity of the matrix and of the embedded phase, respectively,
$T_1$ = Temperature below which structural stresses can no longer be dissipated (approx. 1000° C.)
$T_o$ = Room temperature,
r = Distance from center of particle.
$\epsilon$ = Linear expansion due to phase transformation.

Although the maximum tensile stress is independent of the particle size, microfissures have been observed only around larger, not about smaller particles—in other words, there is a critical particle size $D_c$ below which no more fissures are produced. Equation 2 has been derived for the critical particle size:

$$D_c \geqq \frac{C}{\sigma_t^2} \quad (2)$$

wherein C is a constant for a certain matrix particle combination. In the case of most material combinations, in which the expansion coefficient of the matrix is greater than that of the second phase, very large particles must be used in order to fulfill the fissure forming criterion (2). However, the critical flaw size then becomes so great due to the interaction of the microfissures with the large particles that the strength is considerably reduced.

It has been found that in the case of polymorphous substances in which the phase transformation of two solid phases is associated with a considerable change in volume, even very small particles fulfill the fissure forming criterion (2). The tensile stresses produced in the case of such a phase transformation far exceed the stresses created on the basis of the difference in the coefficients of expansion. With small particles, however, the critical flaw size is kept low, too, so that for such a combination of materials the result is an unimportant reduction of the strength.

It has furthermore been found that unstabilized zirconium dioxide particles are especially suited for the production of very small and uniformly divided microfissures. Also suitable, however, are hafnium dioxide ($HfO_2$) particles, carbides and nitrides. Suitable ceramic matrices are, for example, aluminum oxide and magnesium oxide and $Si_3N_4$, SiC, ZnO, $Cr_2O_3$, mullite and zircon.

The invention will be explained with the aid of the appended drawings and a number of ceramic bodies in accordance with the invention which have been selected only by way of example, and which consist of an $Al_2O_3$ matrix and $ZrO_2$ particles dispersed therein.

FIG. 1 shows a diagram indicating, for two different zirconium dioxide grain sizes, the toughness $K_{Ic}$ of ceramic bodies made therefrom (matrix $Al_2O_3$) having a zirconium dioxide content which remains the same within the body, and showing the relationship of said toughness to the material composition of said body.

The toughness $K_{Ic}$ is given in $MN/m^{3/2}$, and the material composition in percent of zirconium dioxide by volume.

FIG. 1 also shows a diagram reflecting the ultimate bending strength S of the body for one size of zirconium dioxide grains, again in relationship with its material composition, given in $MN/m^2$.

Figure 4:
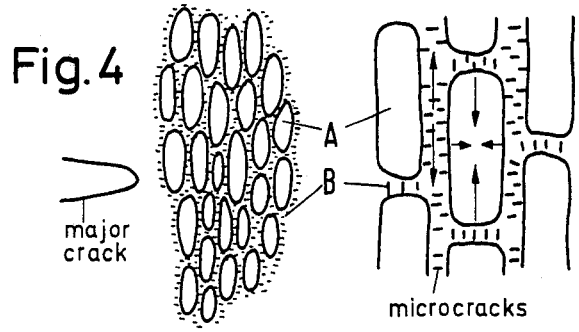
Figure 5:
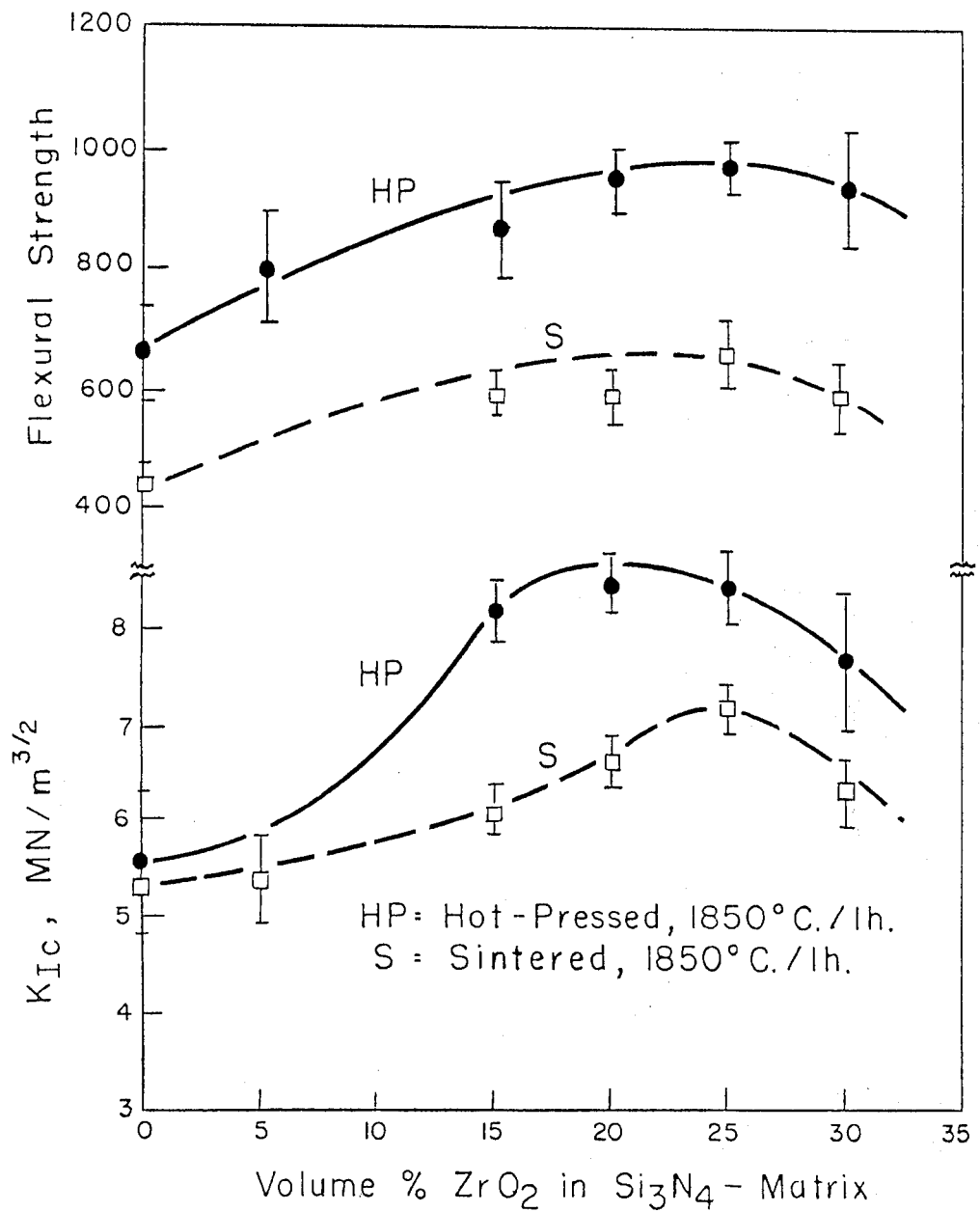
Figure 6:
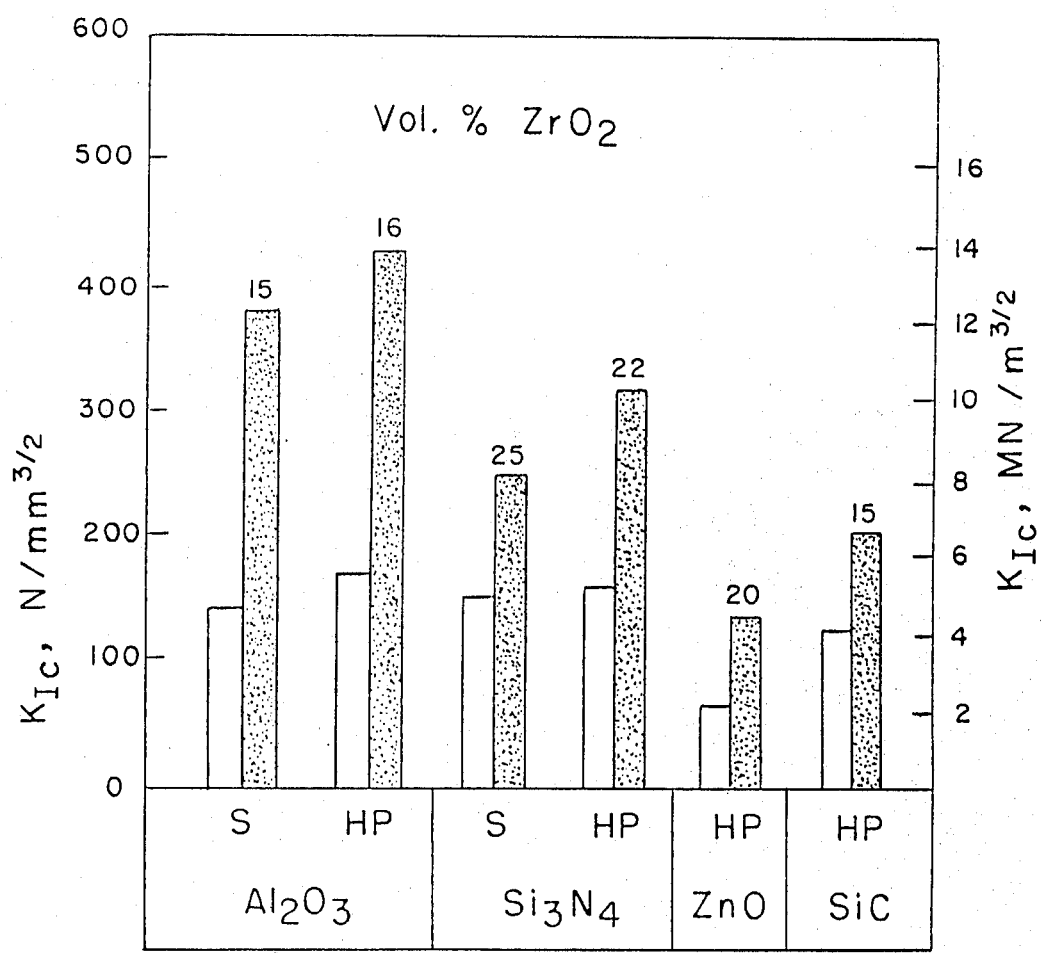

FIG. 4 shows diagramatically the orientation of the microfissures in a ceramic body which contains an additionally embedded phase with a higher content of ceramic embedment material than the ground material, FIG. 5 shows the relationship between strength of a ceramic body in relation to the volume % of the zirconium in the matrix, and FIG. 6 shows the relationship between strength and volume % zirconium in various matrix materials.

Figure 1:
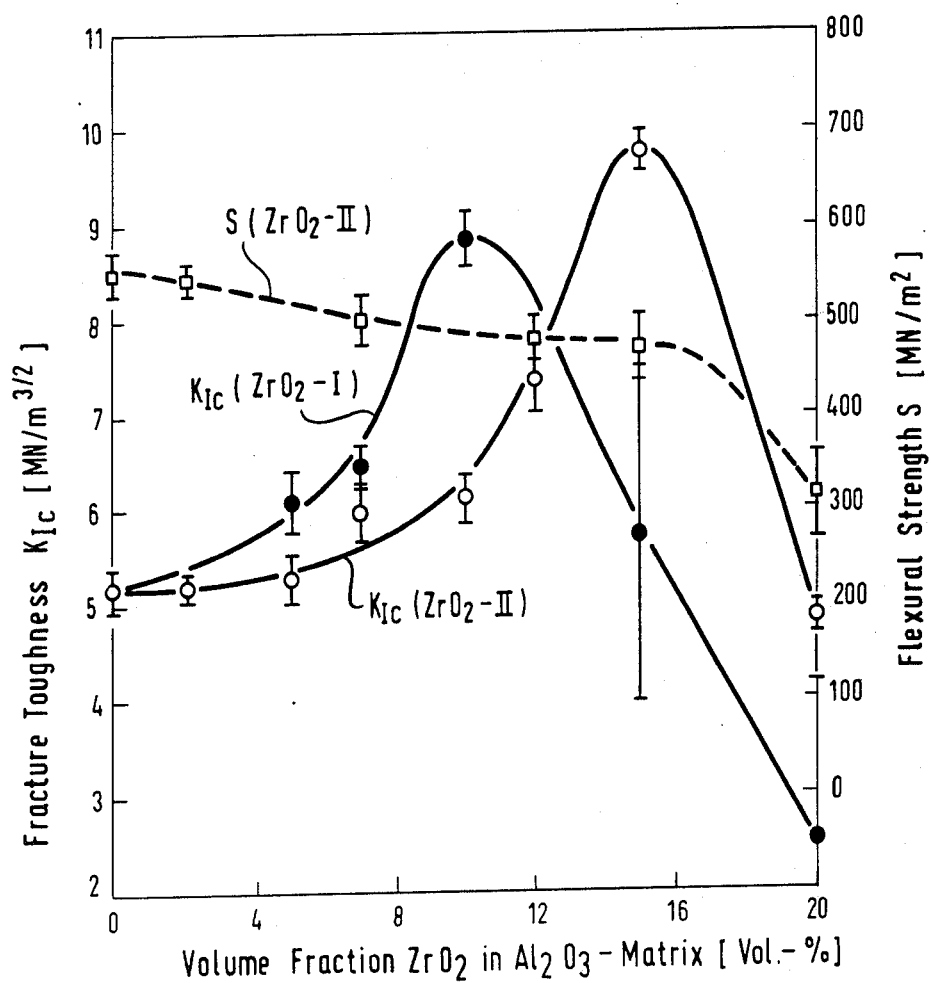

In FIG. 1 the toughness curves are drawn in solid lines, and the ultimate tensile strength curve is a broken line. "$ZrO_2$-I" designates the curve which reflects the toughness of bodies which have been prepared using unstabilized zirconium dioxide particles of an average particle size of 0.3 micrometers, and "$ZrO_2$-II" identifies the curves representing the toughness and ultimate bending strength of bodies prepared by using unstabilized zirconium dioxide particles of an average particle size of 1.24 micrometers. The $K_{Ic}$ curves have a pronounced maximum and drop off sharply again as the zirconium dioxide content increases. First the $K_{Ic}$ factor increases with increasing zirconium dioxide content, beginning from the $K_{Ic}$ factor of pure aluminum oxide (=0 vol.-% $ZrO_2$), which is explained by the fact that fracture energy is absorbed. The nucleation and opening of fissures and subcritical fissure growth as well as fissure branching are assumed to be the mechanisms of the absorption. The microfissure density increases as the zirconium dioxide content increases, and the toughness increases with it. After the $K_{Ic}$ maximum is passed, the zirconium dioxide content becomes so high that an agglomeration of particles occurs and a joining up of fissures between the particles. This results in a lowering of the toughness. The best results were achieved when the $ZrO_2$ agglomerate size in the hot-pressed ceramic bodies was from 2 to 15 μm. Such an agglomerate size was achieved when the starting materials were mixed together for ten minutes in the manner described hereinbelow. Very brief mixing times resulted in large agglomerate sizes, which produced low $K_{Ic}$ values on account of excessive fissuring. Longer mixing periods caused a shifting of the $K_{Ic}$ maximum towards higher zirconium dioxide contents with a simultaneous lowering of the maximum, due to excessively small agglomerate sizes. From this it can be assumed that the critical particle size $D_c$ in equation 2 must be around 3 micrometers. The critical particle size is this small because the tensile stresses around the zirconium dioxide particles in the aluminum oxide matrix can assume values of 2000 $MN/m^2$. This value, which has been calculated in accordance with Equation 1, is almost one order of magnitude higher than the breaking strength of $Al_2O_3$. The high tensile stresses develop upon the cooling of the ceramic bodies fired at temperatures of 1400° to 1500° C., because above about 1100° the zirconium dioxide is in its tetragonal modification (Density at 1250° C.: ~6.16 $g/cm^3$), and when its temperature drops below the transformation temperature it passes into the monoclinic modification (density: ~5.84 $g/cm^3$), which entails a considerable expansion of volume. The tensile stresses then lead to the formation of the microfissures which increase the toughness of the bodies.

The microfissure density increases still further as the stressing of the ceramic bodies increases, because in that event the combining of the stresses caused still more fissures to form even on those particles whose size is smaller than the critical particle size $D_c$, i.e., on those particles which had originally created only microfissure nucleation sites.

As it can be seen in FIG. 1, the $K_{Ic}$ maximum of ceramic bodies made using zirconium dioxide particles of an average particle size of 1.25 μm and with a zirconium dioxide content of 15 vol.-% is 10 $MN/m^{3/2}$, which corresponds to an effective fracture energy of 125 $J/m^2$, and is thus almost twice as high as the $K_{Ic}$ value of pure aluminum oxide. Up to a $ZrO_2$ content of 15 vol.-%, the ultimate bending strength of the bodies diminishes only slightly. This means that the embedded particles and the microfissures are still largely isolated. Higher zirconium dioxide contents, however, increase the critical flaw size.

Figure 2:
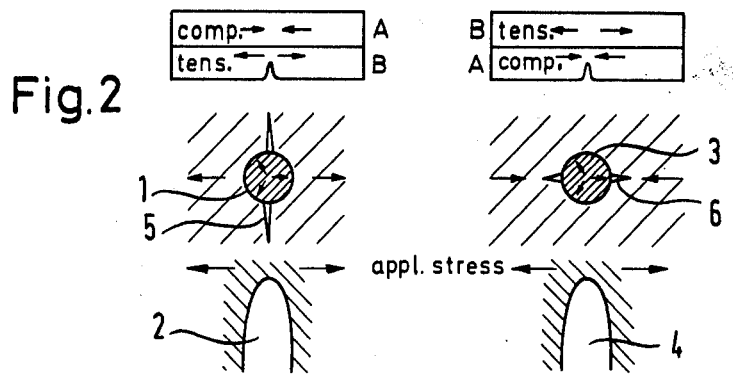
FIG. 2 shows diagrammatically the oriented formation of microfissures before a fissure front, in the case of ceramic bodies consisting of two layers of different contents of ceramic embedment material.

FIG. 2 shows diagrammatically an example of combined, uniformly oriented stresses in ceramic bodies which simultaneously permit the examination of the influence of these stresses on the toughness. The notched bodies consist of two layers, each consisting of $Al_2O_3$ and an unstabilized zirconium dioxide phase dispersed therein. Layer A contains a higher volume of zirconium dioxide than layer B. Upon cooling from the hot pressing temperature, layer A shrinks less than layer B, because more zirconium dioxide particles, which expand upon phase transformation from the tetragonal to the monoclinic modification, oppose the contraction. This produces tensile stresses in layer B and compressive stresses in layer A; accordingly, microfissures 5 extending parallel to the notch 2 are produced in the case of the inclusions 1 (left side of FIG. 2), and microfissures 6 are produced in the case of inclusions 3 and extend perpendicular to notch 4 (right side of FIG. 2). Since in the case of the bodies shown on the left (case B) the superimposed tensile stresses are added to the tensile stresses developing about the inclusions 1 (in situ tensions), microfissures can be formed starting out from smaller $ZrO_2$ particles than is the case with the body illustrated on the right (case A), where the compressive stresses are subtracted. This in turn leads in layer B to a higher microfissure density than in layer A.

Figure 3:
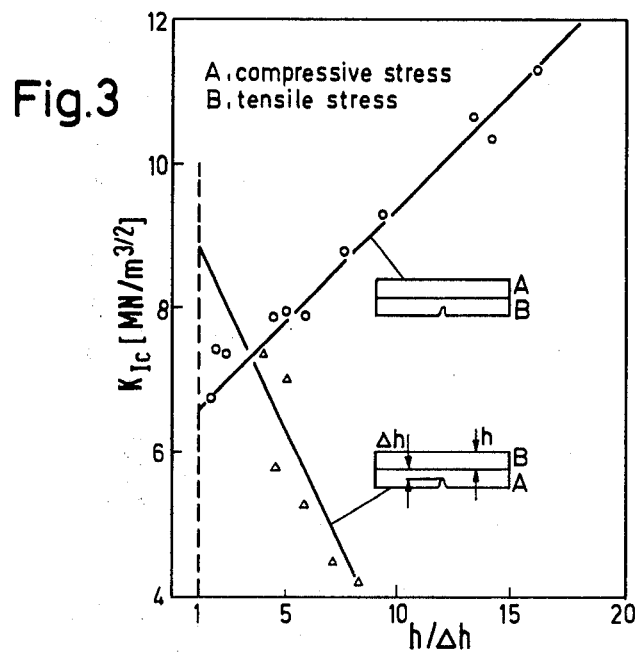
FIG. 3 shows the toughness curve of ceramic bodies built up in two layers.

In FIG. 3, the toughness of $Al_2O_3/ZrO_2$ bodies is plotted against $h/\Delta h$, the thickness h of both layers amounting to 4 mm, and $\Delta h$ being the distance between the apex of the notch and the boundary surface, and layer A containing 15 vol.-% $ZrO_2$ and layer B 10 vol.-% $ZrO_2$. As the ratio of h to $\Delta h$ increases, the toughness $K_{Ic}$ increases if the notch is in layer B with superimposed tensile stress, but it decreases if the notch is in layer A with the superimposed compressive stress. The ratio of h:$\Delta h$ corresponds to an increasing depth of the notch and to planes of increasing stress. The stresses in unnotched ceramic bodies increase from 0 at the surface to about 1000 $MN/m^2$ at the boundary surface between the layers. With increasing notch depth, therefore, the area ahead of the fissure front (ahead of the apex of the notch) contains microfissures with an increasing degree of orientation. At the same time the microfissure density increases slightly in the area of the tensile stresses (B) and decreases in the area of the compressive stresses (A). The increasing toughness of the B layers (FIG. 3) can be explained by the effectiveness of the microfissures which are oriented perpendicularly to a stress applied from without (FIG. 2). These microfissures can extend themselves into the fissure front zone, thereby absorbing energy before the main fissure (notch) can propagate itself. The microfissures in layer A, however, orient themselves increasingly parallel to a stress applied from without. Such microfissures cannot propagate themselves further, and therefore they contribute nothing to the energy absorption. This is apparent from the diminishing toughness in FIG. 3. Upon extrapolation to a notch depth of 0, i.e., in the case of $h/\Delta h \rightarrow 1$, $K_{Ic}$ assumes either the value of layer A or the value of B, in agreement with the fact that the superimposed stresses become 0 towards the surface.

With the aid of a ceramic body in accordance with the invention, which is represented diagrammatically in cross section in FIG. 4, and which contains an additionally embedded phase having a $ZrO_2$ content that is different from the content of the ground material, the application of the improved toughness of such bodies containing appropriately oriented microfissures will be discussed. The body consists of a continuous phase, "ground material" B, and a phase A embedded therein, both phases having a composition similar to that of layers A and B in FIG. 3, namely phase A consists of $Al_2O_3$ and 18 vol.% of $ZrO_2$, and phase B consists of $Al_2O_3$ and 12 vol.-% of $ZrO_2$. The body has been produced by the hot pressing of spherical particles of phase A (particle size 70 $\mu$m), which have been coated with the ground material B (coating thickness 20 $\mu$m). Since the hot pressing is performed parallel to the longitudinal direction of the notch in FIG. 4, the coated spherical particles become lens-shaped. As it can be seen in the enlargement shown on the right in FIG. 4, the microfissures develop preferably perpendicular to the tensile stress prevailing in phase B. If a stress directed perpendicular to the notch is applied from without, the vertically oriented microfissures propagate, thereby absorbing energy. Extension to the critical size, however, is not possible, because the microfissures cannot penetrate into the areas formed of Phase A, which are under a compressive stress, and B is less than 20 microns thick. In those areas consisting of phase B, where a critical growth of the microfissures would be possible, the microgrooves are oriented parallel to the applied stress, and therefore they cannot propagate. Consequently, a special application of energy is necessary in order either to penetrate the areas formed of phase A or to change the orientation of the microfissures in those areas of B in which they are oriented parallel.

The body represented diagrammatically in FIG. 4 has virtually isotropic properties. The energy that initiated fracture amounted to 117 $J/m^2$ parallel to the direction of the hot pressing, which represents a considerable increase in relation to the fracture energies of $Al_2O_3$ (32 $J/m^2$), component A (50 $J/m^2$) and component B (68 $J/m^2$), each considered separately.

Bodies in accordance with the invention, of the kind described with the aid of FIG. 4, can be made from agglomerates of a component A of a ceramic embodiment content of 4 to 25 vol.-% and of a particle size of 10 to 100 $\mu$m, which is coated in a thickness of 2 to 50 $\mu$m with a component B of a ceramic embedment content differing from that of component A by at least 3 vol.-%.

On the basis of the advantageous properties described, the ceramic bodies of the invention can be used wherever a high resistance to temperature changes, high toughness and high ultimate bending strength are important. Especially advantageous is their use as "ductile" ceramics, particularly as high-temperature gas turbine elements.

EXAMPLES

Additional details of the invention will appear from the examples in conjunction with the drawing and the claims.

EXAMPLE 1 ($ZrO_2$-I IN FIG. 1)

17 g of unstabilized zirconium dioxide powder (corresponding to 10 vol.-% of $ZrO_2$) of an average particle size of 0.3 $\mu$m (Fisher SSS) were mixed wet with 108 g of $Al_2O_3$ (average particle size 0.5 $\mu$m) for 10 minutes in a ball mill (planet mill). 90 ml of ethanol was used as the mixing liquid. The mixing container consisted of sintered $Al_2O_3$ and was filled with 100 aluminum oxide grinding balls of a diameter of 5 mm. The powder mixture was then dried and granulated and hot pressed in graphite molds for one hour at 1400° C. in vacuo to form disks 35 mm in diameter. From these disks rectangular bars were cut to a size of 32×7×3.5 mm and lapped with boron carbide.

For the measurement of the toughness, a notch 0.05 mm wide and about 2.5 mm deep was made with a diamond saw. The $K_{Ic}$ factor was determined by the three point bending test with a transverse main speed of 0.1 mm/min. The bearing spacing was 28 mm as it was in the determination of the ultimate bending strength. A toughness of 8.8 $MN/m^{3/2}$ and an ultimate bending strength of 400±30 $MN/m^2$ Fracture surfaces and thinned specimens were studied by means of scanning and transmission electron microscopy.

EXAMPLE 2 ($ZrO_2$-II IN FIG. 1)

42 g of unstabilized $ZrO_2$ powder of an average particle size of 1.25 $\mu$m (Fisher SSS) was mixed wet in a ball mill with 170 g of $Al_2O_3$ (Fisher diameter 0.5 $\mu$m). These amounts correspond to a volume content of 15% zirconium dioxide. Otherwise the same procedure as in Example 1 is followed, but with the following changes: 170 ml of distilled water, 40 agate grinding balls of a diameter of 10 mm, mixing time 60 minutes, hot pressing time 30 minutes and temperature 1500° C. The toughness of the ceramic bodies thus prepared amounted to 9.8 $MN/m^{3/2}$ and the ultimate bending strength 480±30 $MN/m^2$.

EXAMPLE 3

In the manner described in Example 1, spherical agglomerates of a particle size of 70 μm are prepared from 51.3 g of unstabilized zirconium dioxide powder and 160 g of $Al_2O_3$, corresponding to 18% $ZrO_2$ by volume. Then the agglomerates are coated, to a coating thickness of 20 μm, by a similar procedure, with a mixture prepared from 34.2 g of unstabilized $ZrO_2$ powder, corresponding to 12 vol.-%, and 180 g of $Al_2O_3$. The agglomerates thus coated were hot pressed at a temperature of 1500° C. to form a body whose fracture energy amounted to 117 $J/m^2$.

EXAMPLE 4

25 $cm^3$ of powder blends of $Si_3N_4$ (specific surface, 11.3 m2/g) and $ZrO_2$ ($ZrO_2$-I, same powder as in example 1, published German patent application No. 2,549,652) were ground in volume fractions of 0, 5, 15, 20, 25 and 30% $ZrO_2$ in a 500 $cm^3$ attrition mill (Mod. Pe 5, Gebrüder Netzsch, Selb, W. Germany) for 2 hr. in alcohol at 1000 rpm. The $Al_2O_3$ addition necessary for densification (2.5 wt. % $Al_2O_3$) was made through wear of the $Al_2O_3$ balls, 2–3 mm in diameter, and the $Al_2O_3$ arms of the attritor. After drying, the powder blends were made more dense either by hot pressing or sintering at 1850° C. for 1 hr. The hot-press conditions were: BN-coated 35-mm graphite matrices, 35 $MN/m^2$ pressure, argon stream. For sintering, test pieces 15 mm thick pressed at 100 $MN/m^2$ in steel matrices of 35 mm diameter were embedded in $Si_3N_4$ powder in a closed BN crucible and sintered in a graphite matrix under an argon stream. Rectangular bars with the dimensions 32×7×3.5 mm (in the case of the hot-pressed pieces) and 28×6×3 mm (in the case of the sintered pieces) were then cut from the compacted disks. The toughness $K_{Ic}$ was determined in a four-point bending test with a span ratio of 28/9 mm (hot-pressed) and 20/7 mm (sintered) with a notch 0.05 mm wide and 1 mm deep. The bending strength was determined on 16×2.5×2.5 mm test pieces in a three point test with a span of 12 mm. The results are summarized in FIG. 5. They show that additions of $ZrO_2$ particles substantially improve both the toughness and the flexural strength of $Si_3N_4$.

EXAMPLE 5

25 $cm^3$ (4 80 g) of $Si_3N_4$ powder (as in example 1) was ground for 6 hr. in alcohol with 2-mm $ZrO_2$ balls. In this way, there were introduced into the blend a $ZrO_2$ component of 17 vol. % through wear of the $ZrO_2$ balls and an $Al_2O_3$ component of <1 wt. %. The ground powder blend had a specific surface area of 19 $m^2/g$. It was, as in example 1, dried, hot-pressed into disks (45 mm dia., 10 mm thick), and sawn into rectangular test pieces measuring 40×7.5×3.5 mm. The toughness $K_{Ic}$ in the four-point bending test with a span ratio of 30/8 mm was 10.1±0.3 $MN/m^{3/2}$, and the ultimate bending strength, measured on test pieces of the dimensions 40×3.5×3.5 mm with the same span ratio, 954±17 $MN/m^2$. The $ZrO_2$ particles dispersed in the $Si_3N_4$ matrix consisted of 70% monoclinic $ZrO_2$ and 30% cubic $ZrO_2$.

EXAMPLE 6

25 $cm^3$ of SiC powder (HCST 2828 sinter grade, specific surface area 7.5 $m^2/g$) was blended with 15 vol. % of $ZrO_2$ powder (Auer-Remy, specific surface area 6 $m^2/g$) for 6 hr. in alcohol in a 500 $cm^3$ attritor. To promote densification, 3 wt. % of $Al_2O_3$ was introduced through wear of the attritor balls and arms. After the powder blends had been dried, 35-mm disks were hot-pressed at 1900° C. for 1 hr., as in example 1, and sawn, and the $K_{Ic}$ was found to be 6.5±0.3 $MN/m^{3/2}$. By comparison, the $K_{Ic}$ of a test piece treated in the same way but containing no $ZrO_2$ addition was only 3.9±0.3 $MN/m^{3/2}$.

EXAMPLE 7

25 $cm^3$ of ZnO powder (Merck No. 8846, average particle diameter 0.9μ, specific surface 3.5 $m^2/g$) was blended with the same $ZrO_2$ powder (20 vol. %) as in example 3 for 2 hr. in alcohol in a 500 $cm^3$ attritor. Test pieces which had been hot-pressed for 30 min. at 1200° C. as in example 1 and sawn were found to have a $K_{Ic}$ value of 3.2±0.3 $MN/m^{3/2}$. Test pieces treated in the same way but containing no $ZrO_2$ were found to have a toughness of 2.0±0.2 $MN/m^{3/2}$.

EXAMPLE 8

25 $cm^3$ of $Al_2O_3$ powder (as in examples 1 and 2 of the published unexamined German patent application) was ground for 8 hr. in water in a 500 $cm^3$ attritor with 15 vol. % of $ZrO_2$ (as in example 3). Test pieces which as in example 1 had been hot-pressed for 30 min. at 1500° C. and then sawn were found to have a $K_{Ic}$ of 14.5±0.6 $MN/m^{3/2}$ and a bending strength in the as-sawn surface condition of 980±60 $MN/m^2$. The embedded $ZrO_2$ particles consisted to the extent of 60% of tetragonal $ZrO_2$ and to the extent of 40% of monoclinic $ZrO_2$. Test pieces treated in the same way but containing no $ZrO_2$ were found to have a $K_{Ic}$ value of 6.5±0.4 $MN/m^{3/2}$ and a strength of 550±30 $MN/m^3$.

EXAMPLE 9

25 $cm^3$ of $Al_2O_3$ was ground as in example 5 with 15 vol. % of $HfO_2$ (specific surface, 4 $m^2/g$) and 1 vol. % $Y_2O_3$ (specific surface, 5.5 $m^2/g$). The powder blends were hot-pressed at 1650° C. for 30 min. as in example 5. The $K_{Ic}$ value of the appropriately cut test poieces was 8.5±0.4 $MN/m^{3/2}$. This compares with 6.5±0.4 $MN/m^{3/2}$ for $Al_2O_3$ treated in the same way but incorporating no embedments.

FIG. 6 hereof shows the optimum improvements in $K_{Ic}$ values achievable in different ceramics by use of the present invention utilizing different matrix materials, viz., $Al_2O_3$, $Si_3N_4$, ZnO, and SiC as indicated therein. The white column represents the $K_{Ic}$ value of conventional ceramics, the dark column adjacent thereto in each instance shows the $K_{Ic}$ values achieved by use of the present invention both for the sintered embodiment (S) and for the hot-pressed embodiment (HP).

It will be understood that the specification and examples are illustrative but not limitative of the present invention and that other embodiments within the spirit and scope of the invention will suggest themselves to those skilled in the art.

What is claimed is:

1. A method of preparing a ceramic body of high toughness by mixing an aluminum oxide matrix forming ceramic material and a ceramic embedment material, shaping and firing, comprising mixing 4% to 25% of the volume of the body, of unstabilized zirconium dioxide and/or hafnium dioxide in the form of 0.3 to 1.25 μm particles as the embedment material, with the aluminum oxide matrix forming ceramic material in the form of particles of less than 5 μm, in a ball mill, including an inert mixing and grinding container and inert balls and with the use of an inert mixing liquid, or in an attrition mill, and thereafter sintering by pressing the mixture to form a body and sintering or sintering by hot pressing the mixture in a mold, at a temperature of 1400° to 1500° C., whereby tensile stresses for the formation of controlled microfissures are generated in the ceramic body.

2. The method of claim 1 wherein the mixture is dried before sintering.

3. The method of claim 1 wherein a graphite mold is used as the hot-press mold.

* * * * *

UNITED STATES PATENT AND TRADEMARK OFFICE
CERTIFICATE OF CORRECTION

PATENT NO. : 4,419,311
DATED : December 6, 1983
INVENTOR(S) : Nils Claussen

It is certified that error appears in the above-identified patent and that said Letters Patent are hereby corrected as shown below:

Name of Assignee: Max-Planck-Gesellschaft zur Forderung Wissenschaften e.V., Gottingen, Fed. Rep. of Germany Attorney, Agent or Firm: Felfe & Lynch Signed and Sealed this Twenty-eighth Day of August 1984

[SEAL]

Attest:

Attesting Officer

GERALD J. MOSSINGHOFF

Commissioner of Patents and Trademarks